JOHNSON & KREISCHER.
Grain Reservoir.
No. 112,927.
Patented Mar. 21, 1871.
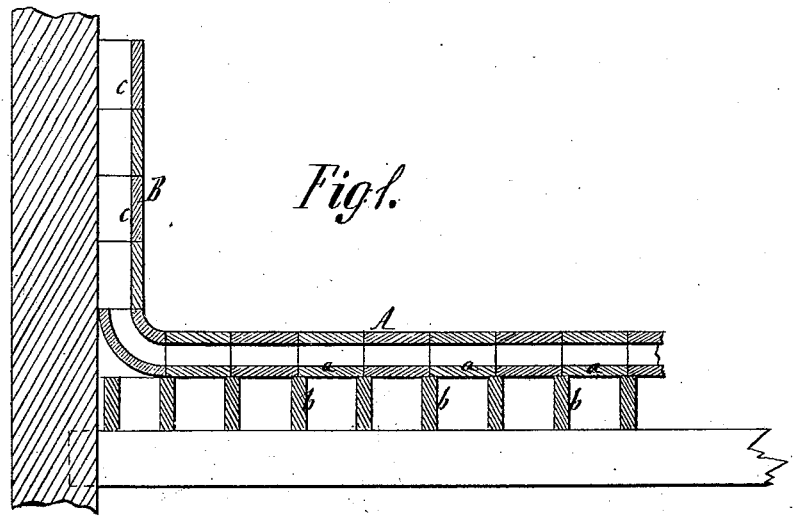
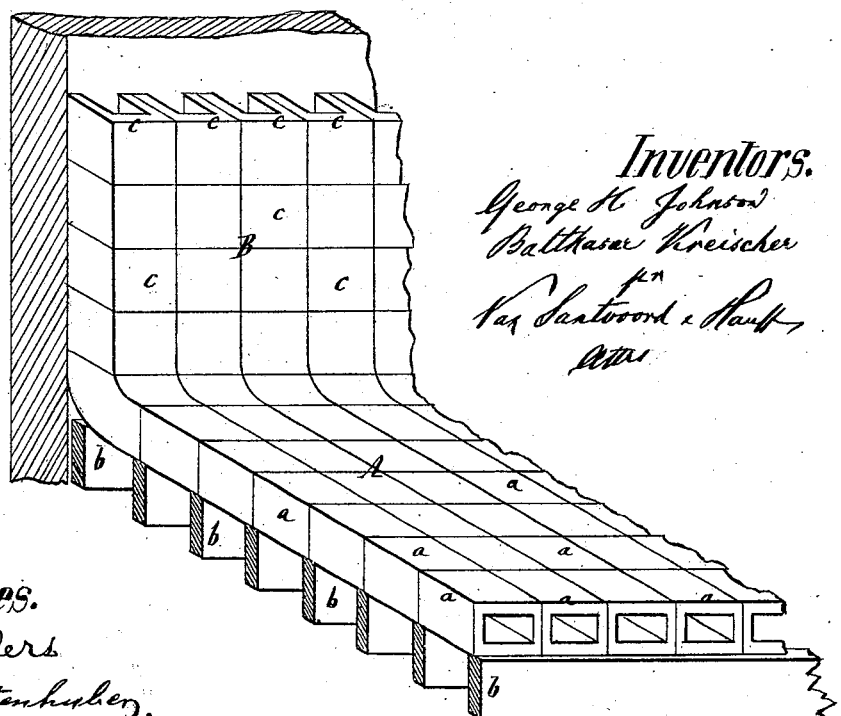

United States Patent Office.

GEORGE H. JOHNSON AND BALTHASAR KREISCHER, OF NEW YORK, N. Y.

Letters Patent No. 112,927, dated March 21, 1871.

IMPROVEMENT IN RESERVOIRS FOR GRAIN AND OTHER MATERIALS.

The Schedule referred to in these Letters Patent and making part of the same.

*To all whom it may concern:*

Be it known that we, GEORGE H. JOHNSON and BALTHASAR KREISCHER, both of the city, county, and State of New York, have invented a new and improved Reservoir for Grain and other Materials; and we do hereby declare the following to be a full, clear, and exact description thereof, which will enable those skilled in the art to make and use the same, reference being had to the accompanying drawing forming part of this specification, in which drawing—

Figure 1 represents a longitudinal vertical section of this invention.

Figure 2 is a perspective view of the same.

Similar letters indicate corresponding parts.

This invention relates to an improvement on a patent granted to George H. Johnson and George Wilson for a process for drying and renovating grain, dated February 9, 1867, and numbered 86,758; the object of our present improvement being to produce an apparatus for carrying out said process in an easy and practicable manner.

The floor of our reservoir is composed of porous tiles made in the form of rectangular tubes, and supported by wooden beams or girders, while the sides of the reservoir are built up of ⊔-shaped tiles, the open sides of which bear against the wall of the building in which the reservoir is to be erected, in such a manner that the tiles composing the floor form flues for the passage of currents of hot or cold air, and at the same time the beams are protected against the influence of heat when currents of hot air are used, while the ⊔-shaped tiles, together with the walls of the building, form a continuation of the air-flues.

In the drawing—

The letter A designates the floor of our reservoir, which is composed of a series of tiles, *a*, made of porous clay in the form of rectangular tubes, as shown in the drawing, and of such a length that they extend from one beam, *b*, to the next, so that they can be readily and conveniently placed side by side.

The sides B of our reservoir are made of ⊔-shaped tiles *c*, the open sides of which are placed against the wall of the building in which the reservoir is to be put up.

By these means a series of air-flues is formed, through which currents of hot or cold air can be passed, and at the same time the floor-beams are fully protected against the injurious influence of the heat when currents of hot air are made to pass through flues in the floor and in the sides of our reservoir.

By these means a reservoir is obtained in which grain or other material of a similar nature can be readily dried or kept dry, since the porous tiles absorb the moisture contained in the grain, and the currents of air passing through the air-flues in the said tiles carry off said moisture, as fully described in the patent 86,758, above referred to.

What we claim as new, and desire to secure by Letters Patent, is—

1. A reservoir for grain and other material of a similar nature, having its floor constructed of rectangular hollow porous tiles *a*, supported by beams *b*, in the manner substantially as herein shown and described.

2. A reservoir for grain and other material of a similar nature, having its sides constructed of ⊔-shaped porous tiles, in the manner set forth.

GEO. H. JOHNSON.
BALTHASAR KREISCHER.

Witnesses:
W. HAUFF,
E. F. KASTENHUBER.